Feb. 6, 1962 L. S. BOURQUIN 3,019,734
APPARATUS FOR PRESSURE TESTING HOLLOW BODIES FOR LEAKAGE
Filed Oct. 28, 1958 3 Sheets-Sheet 1

Fig.1.

INVENTOR:
Landrum S. Bourquin,
BY Cushman, Darby & Cushman
ATTORNEYS.

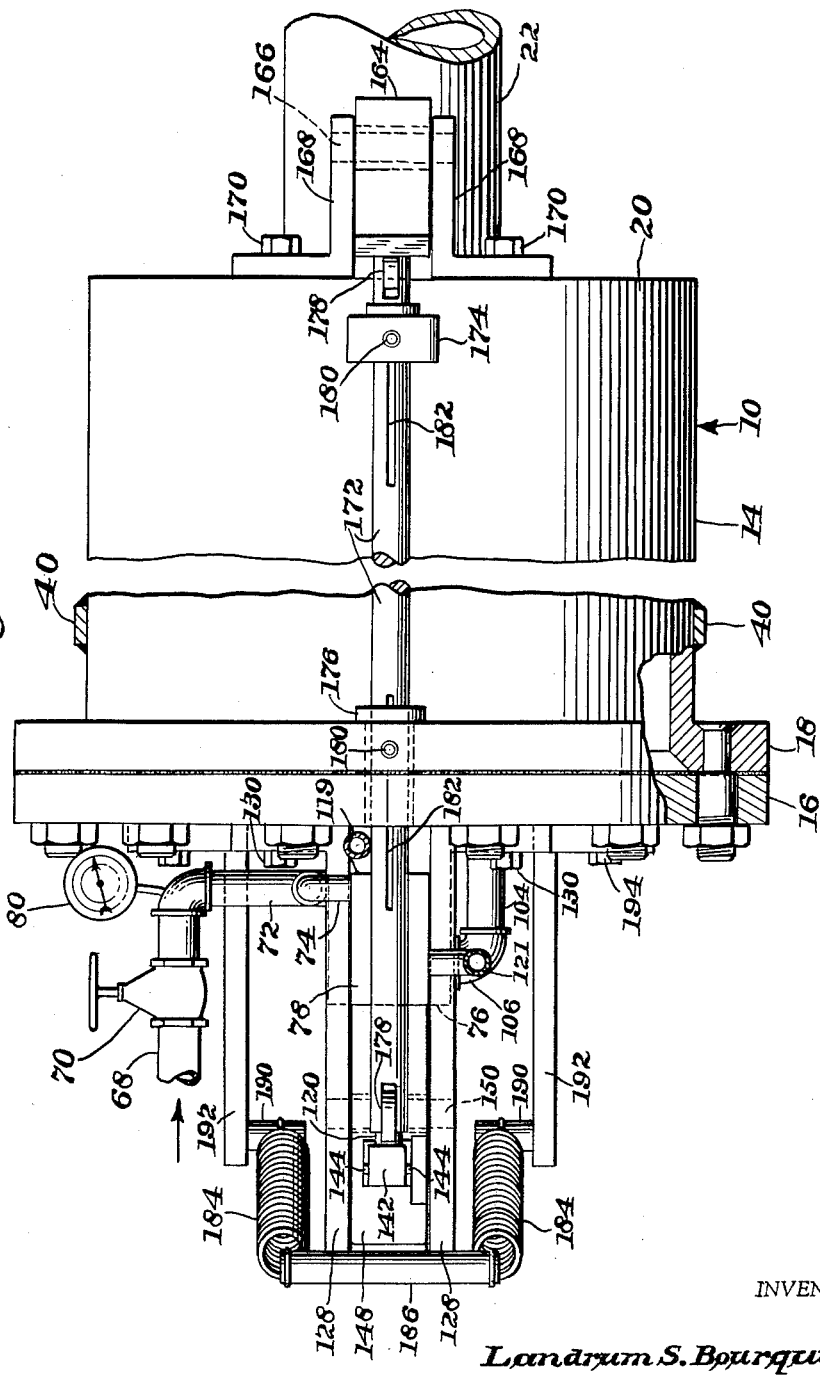

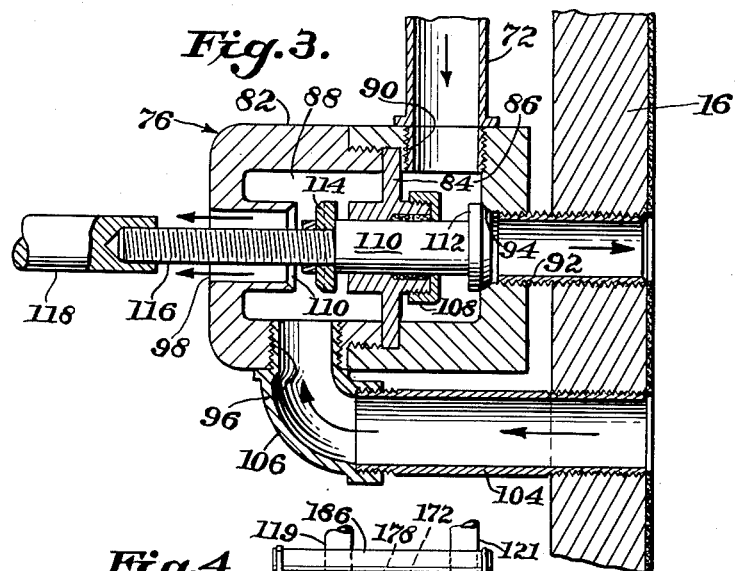
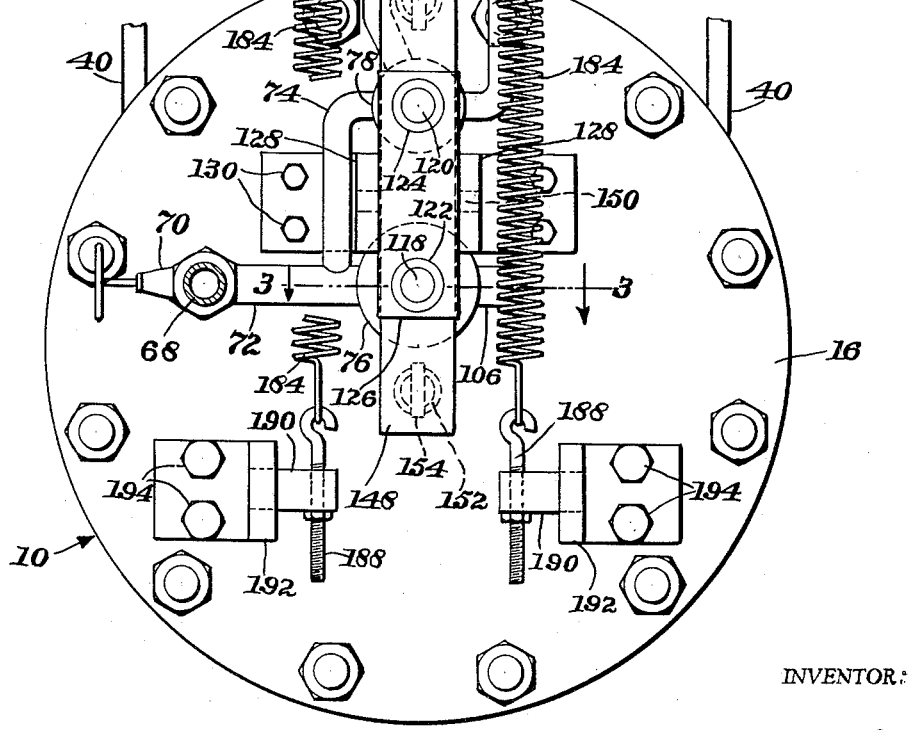

3,019,734
APPARATUS FOR PRESSURE TESTING HOLLOW BODIES FOR LEAKAGE
Landrum S. Bourquin, Savannah, Ga., assignor to Savannah Machine & Foundry Company, Savannah, Ga., a corporation of Georgia
Filed Oct. 28, 1958, Ser. No. 770,023
4 Claims. (Cl. 103—49)

The present invention relates to apparatus for testing hollow bodies, such as a pressure vessel, for leakage. More particularly, this invention relates to improved apparatus for boosting the pressure of a low pressure liquid, such as water in a city water system, and supplying the liquid under a predetermined boosted pressure to a hollow body for testing the same for leakage.

Apparatus of the general type with which this invention is concerned is known, and in general, consists of a differential piston and cylinder arrangement for multiplying or boosting a given pressure, such as that existing in a city water system, and supplying the water under the higher pressure to the appliance to be tested. It frequently occurs, however, that a leak occurs or exists in the appliance to be tested. On the occurrence of such a leak, the aforedescribed differential cylinder and piston arrangement will maintain the desired test pressure only until the end of the stroke of the piston. At that time, the piston must be recycled, and during such recycling the test pressure, by reason of leakage, drops below the required value.

Accordingly, it is an object of this invention to provide improved testing apparatus of the differential cylinder and piston type for boosting the pressure of a liquid to supply the liquid under a predetermined boosted pressure to an appliance to be tested, and for constantly maintaining the predetermined boosted pressure even though leakage develops in the appliance.

It is another object of this invention to provide a hydraulic testing apparatus that is simple in construction, with resulting economies of manufacture, and also simple in operation with resulting economies in labor.

Other objects and advantages of this invention will become apparent from the following description and accompanying drawings in which:

FIGURE 1 is a side view, partly in vertical section, of testing apparatus embodying this invention.

FIGURE 2 is an enlarged fragmentary view taken substantially on line 2—2 of FIGURE 1.

FIGURE 3 is an enlarged fragmentary sectional view taken substantially on line 3—3 of FIGURE 4.

FIGURE 4 is an enlarged fragmentary end view of the apparatus shown in FIGURE 1, and taken from the left hand side of the latter figure.

Referring now to the drawings, there is shown a pair of differential cylinder and piston assemblies 10 and 12. The main assembly 10 includes a large cylinder 14 having a head 16 bolted onto a flange 18 on one end thereof and a substantially integral head 20 at the other end thereof. Secured coaxially to the head 20 is a smaller cylinder 22 that has its inner end in open communication with the interior of the cylinder 14 and its outer end closed, as by an integral head 24. A piston 26 is slidable in the large cylinder 14 and has coaxially secured thereto a smaller piston 28 that is slidable in the small cylinder 22. The head 20 of the large cylinder 14 is provided with a pressure relief opening 30.

The other or auxiliary piston and cylinder assembly 12 is substantially identical in construction to the assembly 10, having a large cylinder 32 and piston 34 and a small cylinder 36 and piston 40. Both assemblies 10 and 12 also have the same differential ratio, i.e., the ratio of the cross-sectional area of the larger cylinder to the cross-sectional area of the smaller cylinder. The auxiliary assembly 12, however, need not have as large a displacement as the main assembly 10. For example, the cylinder 32 may be of smaller diameter than the cylinder 14 so that the displacements of the two pistons 34 and 38, during their strokes, is less than that of the pistons 26 and 28 of the assembly 10. While the assembly 12 may be disposed and supported in any suitable location, it may be supported conveniently on the assembly 10, as by brackets 36 that are welded to the cylinders 14 and 32 to support the latter in overlying spaced parallel relation with the cylinder 14.

Each of the differential piston and cylinder assemblies 10 and 12 is adapted to develop a higher, and the same, pressure in the smaller cylinders 22 and 36 for testing purposes. The test liquid may be supplied from any readily available source, but preferably is in the form of water from any convenient water supply system, such as a city system having a supply conduit 42 controlled by a manually controlled valve 44. Connected to the outlet side of the valve 44 is a T 46 having branch conduits 48 and 50 connected to the opposite ends thereof and to the outer ends of the smaller cylinders 22 and 38, respectively. Connected into each conduit 48 and 50 is a check valve 52 and 54, respectively, to prevent back flow of fluid from the smaller cylinders 22 and 36 into the conduit 42 or into the other branch 50 or 48, respectively. Also connected to the outer ends of the smaller cylinders 22 and 36 are two conduits 56 and 58 which may be joined together, as by a T 60, and thence extended as a single conduit 62 for supplying water under a predetermined pressure, higher than the system pressure, i.e., than the pressure in the conduit 42, to an appliance, such as a pressure vessel (not shown), to be tested. Back flow of liquid through the conduits 56 and 58 also is prevented by check valves therein, 64 and 66, respectively.

Pressure fluid for operating the differential piston and cylinder assemblies 10 and 12 in order to develop the higher test pressure in the smaller cylinders 22 and 36 may be in the form of compressed air supplied from any suitable source through a conduit 68 that is connected to the inlet side of a pressure regulator 70, as shown in FIGURES 2 and 4. From the regulator 70 the air under reduced pressure is conducted, via a conduit 72 and a branch conduit 74, to the inlets of two control valves 76 and 78, respectively, one (76) for controlling the admission of air under pressure to, and the exhaust of air from, the larger piston and cylinder assembly 10, and the other (78) for the smaller differential piston and cylinder assembly 12. Preferably, a pressure gauge 80 (FIGURE 2) is connected to the conduit 72. The gauge may have two sets of indicia, one indicating actual pressure and the other the test pressure in the cylinders 22 or 36. Since the control valves 76 and 78 are identical in construction, a description of one will suffice for both.

For example, the valve 76 includes a housing 82 provided with an interior partition 84 that divides the housing into a supply valve chamber 86 and an exhaust valve chamber 88. The chamber 86 is provided with an inlet 90, to which the supply conduit 72 is connected and an outlet 92 having a valve seat 94, while the chamber 88 is provided with an inlet 96 and an outlet 98 having a valve seat 100 opposite and coaxial with the seat 94. The outlet 92 communicates with the interior of the larger cylinder 14, as by a supply nipple 102 that is screwed into the outlet and into the cylinder head 16, while the inlet 96 also communicates with the interior of the cylinder 14, as via the short exhaust pipe section 104 and the elbow 106. Reciprocal through a stuffing box 108 in the partition 84 is a valve stem 110 carrying valve members 112 and 114 that are cooperative respectively with the seats 94 and 100. The arrangement is such that when the member 112 seats on the seat 94, the member 114 is unseated, and vice versa. Extending coaxially through the outlet 98 is a reduced and threaded stem extension 116 which may be threaded into a socket on the end of a valve operating rod 118. The valve 78 is connected to the interior of the larger cylinder 32 of the auxiliary assembly by a supply conduit 119 and an exhaust conduit 121.

The valves 76 and 78 are mounted on the cylinder head 16 with their stems 110 and corresponding operating rods 118 and 120 in spaced parallel relation and with the outer ends of such rods slidably disposed in bushings 122 and 124, respectively, carried by a bracket 126 provided with spaced parallel arms 128 that have their inner ends secured, as by screws 130, to the cylinder head 16. Each of the rods 118 and 120 is provided with spaced collars defining pairs of opposed shoulders 132 and 134, and 136 and 138, respectively, between which are slidably mounted operating sleeves 140 and 142, respectively, each having a pair of laterally extending trunnions 144. The trunnions 144 of each sleeve 140 and 142 are pivotally mounted in elongated slots 146 in the side walls of an opening in a rocker arm 148, with each sleeve being disposed in a separate opening. The rocker arm 148 is pivotally mounted, intermediate its ends, on a pivot pin 150 supported and extending between the bracket arms 128.

From the construction thus far described, it will be seen that when the rocker arm 148 is moved counterclockwise, as shown in FIGURE 1, the sleeve 142 will abut the shoulder 136 on the rod 120 and thereby operate the valve 78 to admit air under pressure to the cylinder 32 while shutting off the exhaust therefrom. At the same time, the sleeve 140 will engage the shoulder 134 on the rod 118 and operate the valve 76 to shut off the supply of air to the cylinder 14 while exhausting the same to the atmosphere. Consequently, the assembly 12 will be operated to supply test pressure to the conduit 58 while water under system pressure will flow through the conduit 48 and force the smaller piston 28, together with the piston 26, to the rear because the check valve 64 will be closed by the higher pressure existing in the conduit 62. When the rocker arm 148 is swung clockwise from the position shown in FIGURE 1, it will be seen that the valves 76 and 78 will be reversely operated so that test pressure will be developed in the cylinder 22 by the piston 28 while the piston 38, together with the piston 34, will be pushed to the rear, in preparation for another test-pressure-developing stroke, by the system pressure of the water in conduit 50.

The rocker arm 148 is automatically operated at the end of each stroke of the pistons 26 and 28, and for this purpose a push rod 152, having a roller 154 on the outer end thereof, extends through a stuffing box 156 in the cylinder head 16 and into the cylinder 14 in position to be engaged by the piston 26 on its return stroke. Preferably, a coil compression spring 158 is interposed between the cylinder head 16 and an enlargement 160 on the inner end of the push rod 152 in order to maintain the latter in a position to be engaged by the piston 26 before the end of its return stroke. Absent the spring 158, the admission of air under pressure into the cylinder 14 would push the rod 152 outwardly. A similar push rod 162 extends through the other and integral cylinder head 20 in position to be engaged by the piston 26 somewhat before the end of its pressure-developing stroke. The outer end of the push rod 162 is adapted to engage one end of a lever 164 pivotally mounted between its ends on a pivot pin 166 supported between a pair of brackets 168 that are secured, as by screws 170, to the cylinder head 20. The other end of the lever 164 is adapted to engage one end of another push rod 172 that is disposed exteriorly of and parallel to the axis of the cylinder 14 and has its other end positioned to be engaged with the upper end of the rocker arm 148. The push rod 172 may be mounted in a bushed apertured lug 174, welded or otherwise suitably secured on top of the forward end of the cylinder 14, and in a bushing 176 disposed in aligned guide apertures in the flange 18 and in the cylinder head 16. Preferably, the ends of the push rods 162 and 172 engageable with the rocker arm 148 and with the lever 164 are provided with anti-friction rollers 178, and the push rods 162 and 172 may be restrained against rotative movement, in order to maintain the rollers in proper operative position, by guide screws 180 that extend slidably into longitudinal grooves 182 in the rods.

From the foregoing construction it will be seen that as the piston 26 moves to the left on its return stroke, for example, it engages the push rod 152 which, in turn, swings the rocker arm 148 clockwise to thereby shut off the supply of air to the cylinder 32 and admit air under pressure to the cylinder 14 so that the pistons 34 and 38 will commence a return stroke while the pistons 26 and 28 begin a pressure-developing stroke. At the end of this pressure-developing stroke of the pistons 26 and 28, the piston 26 will engage the push rod 162 which will operate through the lever 164 and the push rod 172 to engage the rocker arm 148 and move it again counter-clockwise so that while the pistons 26 and 28 are on their return stroke the pistons 34 and 38 maintain the test pressure.

Preferably, the rocker arm 148 operates with a snap action so that the operation of the valves 76 and 78 is effected simultaneously and with extreme rapidity so that there will be no interruption in the maintenance of the test pressure on the transfer of the development of the same from one set of pistons to the other. For this purpose, a pair of coil tension springs 184 may be connected to the opposite ends of a cross bar 186 welded, or otherwise suitably secured, to the upper end of the rocker arm 148. The other ends of the springs 184 are connected to hook bolts 188 that extend through pivot pins 190 supported on brackets 192 which are secured, as by screws 194, to the cylinder head 16. Referring particularly to FIGURE 1, it will be noted that the axes of the pivot pins 190 are substantially directly below the axis of the rocker arm pivot pin 150. Consequently, when either of the push rods 152 or 172 engages the rocker arm 148 and moves it from one extreme position toward the other, as the rocker arm moves only slightly beyond a substantially upright position, the springs 184 will rapidly snap the arm 148 to the other extreme position, thereby quickly engaging the sleeves 140 or 142 against the shoulders on the valve operating rods 118 and 120 to quickly shift the latter from one position to another.

From the foregoing construction, it will be seen that the larger differential piston and cylinder assembly 10 is the primary source for the development and maintenance of test pressure in the conduit 62. Normally, if no leaks are developed in the appliance being tested, the admission of air under pressure into the cylinder 14 will move the pistons 26 and 28 only a short distance to the right until the test pressure has been developed. Thereupon, the pistons 26 and 28 will stop. On the other hand, if the appliance being tested develops a leak, the pistons 26 and 28 will move to the right and operate the push rod 162. Whereupon, the cylinder 14 will be vented to atmosphere to enable system pressure to return the pistons 26 and 28 for another pressure-developing stroke. During this return stroke of the pistons 26 and 28, the smaller or auxiliary assembly 12 takes over and maintains the predetermined test pressure. Since it normally takes only a very short time to return the pistons 26 and 28, the displacement effected by the piston 38 in the cylinder 36 need be relatively small in comparison to that of the piston 28 in the cylinder 22 in order to maintain test pressure until the main piston and cylinder assembly 10 can again supply and maintain such pressure.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. Apparatus for increasing the pressure of water initially under relatively low pressure, for supplying water at the increased pressure to a hollow body for testing the latter for leakage, and for maintaining the increased pressure of the water in the body even though leakage occurs, comprising: a main differential piston and cylinder assembly; a smaller auxiliary differential piston and cylinder assembly having the same differential ratio as said main assembly, the larger cylinder and piston portions of each of said assemblies defining a single acting fluid motor and the smaller cylinder and piston portion of each of said assemblies defining a single acting liquid pump, the pistons of said assemblies being free of mechanical interconnection; suction conduit means connected to each of said pumps for conducting thereto water under pressure from a common source to effect suction strokes of said pumps; discharge conduit means connected to each of said pumps for conducting therefrom water under an increased pressure to a body to be tested; check valves in each of said conduit means for preventing back flow of water therethrough; conduit means connected to each of said motors for conducting thereto air under a controlled pressure in order to effect a power stroke thereof to increase the pressure of the water supplied to said pumps and discharge the water at such increased pressure; a pair of control valves connected into said last-mentioned conduit means for alternatively supplying or exhausting air to or from each of said motors; and mechanical mechanism connected to said control valves and having lost-motion mechanical engagement with the piston of said main assembly for operating said control valves reversely to supply air to one of said motors and exhaust air from the other.

2. The structure defined in claim 1 in which each assembly includes a large cylinder and a small cylinder extending from one end of said large cylinder, said one end having a ventport therein.

3. The structure defined in claim 1 in which the mechanism includes push rods at the opposite ends of the larger cylinder portion of the main assembly and alternatively engageable by the larger piston of said main assembly.

4. The structure defined in claim 1 in which the control valves are of the reciprocating type and mounted on one end of the main assembly, and the mechanism includes a rocker arm connected to said control valves, spring means engaged with said arm for effecting snap action movements thereof, and push rods operable by the piston of said main assembly and engageable with the opposite ends of said arm.

References Cited in the file of this patent

UNITED STATES PATENTS

| | | |
|---|---|---|
| 1,718,673 | Wettstein | June 25, 1929 |
| 1,985,829 | Hubbard | Dec. 25, 1934 |
| 2,031,456 | Blunt | Feb. 18, 1936 |
| 2,141,731 | Wolfrom et al. | Dec. 27, 1938 |
| 2,186,970 | Hambly | Jan. 16, 1940 |
| 2,449,556 | Kirkley | Sept. 21, 1948 |
| 2,550,678 | Deacon | May 1, 1951 |
| 2,633,739 | Potts | Apr. 7, 1953 |
| 2,696,730 | Justice | Dec. 14, 1954 |